United States Patent
Komaba et al.

(10) Patent No.: US 9,276,262 B2
(45) Date of Patent: Mar. 1, 2016

(54) BATTERY ELECTRODE AND LITHIUM ION SECONDARY BATTERY PROVIDED WITH SAME

(75) Inventors: Shinichi Komaba, Shinjuku-ku (JP); Naoaki Yabuuchi, Shinjuku-ku (JP); Kyomi Tajima, Kurashiki (JP); Junji Fujioka, Ikeda (JP); Naoki Fujiwara, Okayama (JP)

(73) Assignees: TOKYO UNIVERSITY OF SCIENCE EDUCATIONAL FOUNDATION ADMINISTRATIVE ORGANIZATION, Tokyo (JP); KURARAY CO., LTD., Kurashiki-shi (JP)

( * ) Notice: Subject to any disclaimer, the term of this patent is extended or adjusted under 35 U.S.C. 154(b) by 24 days.

(21) Appl. No.: 14/007,554

(22) PCT Filed: Mar. 21, 2012

(86) PCT No.: PCT/JP2012/057161
§ 371 (c)(1),
(2), (4) Date: Sep. 25, 2013

(87) PCT Pub. No.: WO2012/133034
PCT Pub. Date: Oct. 4, 2012

(65) Prior Publication Data
US 2014/0045054 A1   Feb. 13, 2014

(30) Foreign Application Priority Data
Mar. 25, 2011  (JP) .................................. 2011-066942

(51) Int. Cl.
*H01M 4/62* (2006.01)
*H01M 10/0525* (2010.01)
(Continued)

(52) U.S. Cl.
CPC .............. *H01M 4/622* (2013.01); *H01M 4/133* (2013.01); *H01M 10/0525* (2013.01); *H01M 10/0569* (2013.01); *Y02E 60/122* (2013.01); *Y02T 10/7011* (2013.01)

(58) Field of Classification Search
None
See application file for complete search history.

(56) References Cited

U.S. PATENT DOCUMENTS 6,573,004 B1   6/2003  Igarashi et al.
6,770,397 B1 *  8/2004  Maeda et al. ............... 429/217
(Continued)

FOREIGN PATENT DOCUMENTS

EP   1 039 569 A1   9/2000
EP   2 058 882 A1   5/2009
(Continued)

OTHER PUBLICATIONS
International Search Report Issued Jun. 5, 2012 in PCT/JP12/057161 Filed Mar. 21, 2012.
(Continued)

*Primary Examiner* — Patrick Ryan
*Assistant Examiner* — Wyatt McConnell
(74) *Attorney, Agent, or Firm* — Oblon, McClelland, Maier & Neustadt, L.L.P.

(57) ABSTRACT

There are provided a battery electrode wherein an active material layer is formed on a collector surface, and the layer contains an active material and a block copolymer having a vinyl alcohol polymer block; and a lithium ion secondary battery having a laminate structure in which a pair of electrodes having an active material layer are disposed in such a manner that the active material layers face each other via a separator, and an electrolyte composition containing a lithium-containing electrolyte salt fills the gaps between the pair of electrodes and the separator, wherein at least one of the pair of electrodes is the above battery electrode. Thus, there can be provided a lithium ion secondary battery which can be easily produced and be less polarized, exhibiting excellent charge/discharge properties and cycle characteristics.

9 Claims, 1 Drawing Sheet

(51) Int. Cl.
  *H01M 4/133* (2010.01)
  *H01M 10/0569* (2010.01)

(56) References Cited

U.S. PATENT DOCUMENTS

| 2004/0020763 | A1 | 2/2004 | Kanzaki et al. | |
|---|---|---|---|---|
| 2006/0280882 | A1* | 12/2006 | Oka et al. | 428/1.31 |
| 2007/0264570 | A1* | 11/2007 | Oh et al. | 429/217 |
| 2008/0096109 | A1* | 4/2008 | Fukumine et al. | 429/212 |

FOREIGN PATENT DOCUMENTS

| JP | 4-114952 A | 4/1992 |
|---|---|---|
| JP | 11 067216 | 3/1999 |
| JP | 11 250915 | 9/1999 |
| JP | 2000-302526 A | 10/2000 |
| JP | 2004 134365 | 4/2004 |
| JP | 2009 080971 | 4/2009 |
| JP | 2009 238681 | 10/2009 |
| JP | 2011 171185 | 9/2011 |
| WO | 02 39518 | 5/2002 |

OTHER PUBLICATIONS

Extended European Search Report issued Nov. 20, 2014 in Patent Application No. 12764624.8.

* cited by examiner

BATTERY ELECTRODE AND LITHIUM ION SECONDARY BATTERY PROVIDED WITH SAME

This application is a 371 of PCT/JP12/57161, filed Mar. 21, 2012. Priority to Japanese patent application 2011-066942, filed Mar. 25, 2011, is claimed.

TECHNICAL FIELD

The present invention relates to a battery electrode and a lithium ion secondary battery provided with the same.

BACKGROUND ART

There have recently appeared many portable electronic devices such as cell phones, mobile computers and electric tools, and thus, secondary batteries with a high voltage and a high energy density as a power source for such devices have been regarded as important. Furthermore, from the environmental point of view, shift to vehicles utilizing clean energy such as hybrid cars, fuel-cell cars and electric cars has begun and absolutely needs developing a highly durable secondary battery used for their power supply unit. Among secondary batteries used for these applications, a lithium ion secondary battery has gathered attention with an expectation that it could achieve a high energy density, and a number of studies have been made attempting to provide a battery with a higher capacity and a longer life.

A lithium ion secondary battery generally has a laminate structure comprised of a cathode in which a cathode active material layer containing a cathode active material and a binder is formed on a collector; an anode in which an anode active material layer containing an anode active material and a binder is formed on a collector; and a separator intervening between the cathode and the anode disposed in such a manner that their active material layers face each other. Lithium ion secondary batteries have only one laminate structure described above as a whole or two or more such laminates. The interior of the battery is filled with electrolyte composition containing a lithium-containing electrolyte salt and a nonaqueous solvent.

A cathode active material is predominantly a lithium-containing metal compound such as lithium-cobalt complex oxide and lithium iron phosphate. An anode active material is predominantly a carbon material such as graphite having a multilayer structure where lithium ions can be inserted/removed between layers. A cathode and anode can be produced by kneading the above active material, a binder, a solvent and, if necessary, an additive such as an electric conduction aid to prepare an active material slurry, applying the slurry to a collector and removing the solvent by drying to form an active material layer. Furthermore, it is, if necessary, pressed by a rolling press machine or the like.

Examples of a nonaqueous solvent used for an electrolyte composition include carbonate ester compounds such as ethylene carbonate (EC) and propylene carbonate (PC). In general, an electrolyte composition containing EC is widely used, but PC has a lower melting point than EC, having an advantage that it is useful for the used in a low temperature environment.

Here, particularly, a lithium ion secondary battery using graphite as an anode active material has a problem that during initial charging, a carbonate ester compound contained in an electrolyte composition reacts with graphite, leading to decomposition or deterioration. This reaction causes generation of a large amount of gas and formation of a passivation film on an electrode surface and thus generation of irreversible capacity, leading to problems such as reduction of initial charge/discharge efficiency, deterioration of cycle characteristics and safety deterioration of a battery. Furthermore, for an electrolyte composition containing PC, when lithium ions are inserted between graphite layers, co-insertion of solvated PC occurs, causing decomposition of PC and furthermore deterioration of graphite, which leads to capacity decrease of a secondary battery.

In terms of the above problems, it is known that decomposition and deterioration reaction can be inhibited using a polymer having an oxygen-containing functional group capable of coordinating to a lithium ion in a molecular structure such as polyvinyl alcohol, polymethacrylic acid and polyacrylic acid as a binder (see Patent Reference Nos. 1 to 3). It is believed that by coating graphite with a polymer having an oxygen-containing functional group capable of coordinating to a lithium ion in a molecular structure, desolvation of solvent molecules from lithium ions solvated with EC or PC can be accelerated, contact of graphite with solvent molecules can be prevented, and co-insertion of solvent molecules between graphite layers can be prevented.

Patent Reference No. 1 describes a battery electrode using polymethacrylic acid as a binder. However, polymethacrylic acid which has low solubility in water needs the use of an organic solvent as a solvent for preparing an active material slurry containing an active material and a binder. Therefore, in the light of improving workability, a binder with which an active material slurry can be prepared without using an organic solvent is needed.

Patent Reference Nos. 2 and 3 have described an active material slurry using polyvinyl alcohol or a polyacrylic acid salt as a binder and water as a solvent. The use of polyvinyl alcohol as a binder leads to a problem of increase of electrode polarization. Large electrode polarization leads to a large electrode resistance during charge/discharge, which prevents smooth insertion/removal of lithium, resulting in deterioration of charge/discharge properties.

When an acrylic polymer is used as a binder, an active material slurry frequently becomes too viscous to form a good active material layer. Furthermore, an acrylic polymer generally has a high glass-transition point (Tg), so that it frequently forms a hard and brittle active material layer, which causes cracks during production of a battery, leading to tendency to deterioration in productivity.

PRIOR ART REFERENCES

Patent References

Patent Reference No. 1: JP 2009-238681 A.
Patent Reference No. 2: JP 11-67216 A.
Patent Reference No. 3: JP 2009-80971 A.

SUMMARY OF THE INVENTION

Problem to be Solved by the Invention

To solve the above problems, an objective of the present invention is to provide a battery electrode which can be easily produced and can give a less polarized battery exhibiting excellent charge/discharge properties and cycle characteristics, as well as a lithium ion secondary battery provided therewith.

Means for Solving Problem

After intense investigation for achieving the above objective, we have found that a less polarized electrode can be easily produced using a black copolymer having a vinyl alcohol polymer block as a binder, and, after further investigation based on this finding, have achieved the present invention.

Specifically, the present invention relates to the followings.

[1] A battery electrode wherein an active material layer is formed on a collector surface, and the layer contains an active material and a block copolymer having a vinyl alcohol polymer block.

[2] The battery electrode as described in [1], wherein the vinyl alcohol polymer block corresponds to a polymer produced by saponifying a vinyl ester polymer and having a saponification degree of 75 to 99.95 mol %.

[3] The battery electrode as described in [1] or [2], wherein the vinyl alcohol polymer block corresponds to a polymer produced by saponifying a vinyl ester polymer and having a polymerization degree of 200 to 3000.

[4] The battery electrode as described in any of [1] to [3], wherein the block copolymer further comprises a polymer block containing at least one constituent unit selected from the group consisting of an acrylic acid unit, an acrylate salt unit, an acrylate ester unit, a methacrylic acid unit, a methacrylate salt unit and a methacrylate ester unit.

[5] The battery electrode as described in any of [1] to [4] wherein a content of the block copolymer in the active material layer is 1 to 10% by mass.

[6] The battery electrode as described in any of [1] to [5], wherein the active material comprises graphite.

[7] A lithium ion secondary battery having a laminate structure in which a pair of electrodes having an active material layer are disposed in such a manner that the active material layers face each other via a separator, and an electrolyte composition containing a lithium-containing electrolyte salt fills the gaps between the pair of electrodes and the separator, wherein at least one of the pair of electrodes is the battery electrode as described in any of [1] to [6].

[8] The lithium ion secondary battery as described in [7] wherein the electrolyte composition comprises propylene carbonate.

Effect of the Invention

A battery electrode of the present invention can give a less polarized battery exhibiting excellent charge/discharge properties and cycle characteristics. Furthermore, a good active material layer can be easily formed, so that electrode productivity is high and the active material layer is resistant to cracks. Therefore, in production of a battery, processability and an yield are improved, and battery productivity is high.

MODE FOR CARRYING OUT THE INVENTION

There will be described the present invention in detail.

A battery electrode of the present invention has a configuration that an active material layer is formed on a collector surface. The active material layer contains an active material and a block copolymer having a vinyl alcohol polymer block.

In the above block copolymer, there are no particular restrictions to the number of polymer blocks, but because of easiness of production of the block copolymer, the block copolymer contains preferably 2 to 5, more preferably 2 to 3 polymer blocks. Furthermore, a bonding style of these blocks in the block copolymer can be, but not limited to, straight, branched, radial or any combination thereof.

Since a battery having more excellent charge/discharge properties and cycle characteristics can be obtained and furthermore, productivity of an electrode and a battery can be improved, preferably the above block copolymer further contains a polymer block containing at least one constituent unit selected from the group consisting of an acrylic acid unit, an acrylate salt unit, an acrylate ester unit, a methacrylic acid unit, a methacrylate salt unit and a methacrylate ester unit [hereinafter, sometimes referred to as "(meth)acrylic polymer block"].

The above block copolymer having a (meth)acrylic polymer block can consist of vinyl alcohol polymer blocks and (meth)acrylic polymer blocks, but can further contain polymer blocks other than them. A content of the total mass of vinyl alcohol polymer blocks and (meth)acrylic polymer blocks in the mass of the block copolymer is preferably 30% by mass or more, more preferably 60% by mass or more, further preferably 90% by mass or more. Since a battery exhibiting further excellent charge/discharge properties and cycle characteristics can be obtained and productivity of an electrode and a battery can be improved, the block copolymer is preferably a di-block copolymer in which one vinyl alcohol polymer block and one (meth)acrylic polymer block are linearly bonded.

Since a battery having further excellent charge/discharge properties and cycle characteristics can be obtained, a mass ratio of vinyl alcohol polymer blocks to (meth)acrylic polymer blocks in the above block copolymer having a (meth) acrylic polymer block is, as a mass ratio represented as [vinyl alcohol polymer block mass]/[(meth)acrylic polymer block mass], preferably within the range of 100/1 to 100/100, more preferably within the range of 100/5 to 100/75, further preferably within the range of 100/10 to 100/50. When the above block copolymer contains a plurality of vinyl alcohol polymer blocks and/or (meth)acrylic polymer blocks, the above mass ratio is calculated, assuming that the total mass of the plurality of polymer blocks is the mass of each of vinyl alcohol polymer blocks and/or (meth)acrylic polymer blocks.

There are no particular restrictions to the structure of the above vinyl alcohol polymer block as long as it is a polymer block containing a vinyl alcohol unit, and an example is a polymer block corresponding to a polymer produced by saponifying a vinyl ester polymer formed by polymerization of a vinyl ester represented by vinyl acetate, in the presence of an acidic or alkaline agent [hereinafter, sometimes referred to as "polymer (a1)"].

The above vinyl ester polymer can be a homopolymer of a vinyl ester or a copolymer formed by copolymerizing a vinyl ester with another monomer. Examples of such other monomers can include olefins having 2 to 20 carbon atoms such as ethylene, propylene, 1-butene and isobutylene; vinyl ethers such as methyl vinyl ether, ethyl vinyl ether, n-butyl vinyl ether, isopropyl vinyl ether, n-butyl vinyl ether, isobutyl vinyl ether, t-butyl vinyl ether, dodecyl vinyl ether and stearyl vinyl ether; (meth)acrylamides such as acrylamide, methacrylamide, N-methylacrylamide, N-methylmethacrylamide, N-ethylacrylamide, N-ethylmethacrylamide, N,N-dimethylacrylamide, N,N-dimethylmethacrylamide, diacetoneacrylamide, diacetonemethacrylamide, N-methylolacrylamide and N-methylolmethacrylamide; and halogenated vinyls such as vinyl chloride, vinylidene chloride, vinyl fluoride and vinylidene fluoride. A vinyl ester polymer can contain a constituent unit derived from one or two or more of these other monomers. A proportion of constituent units derived from the above other monomers to the total constituent units constituting a vinyl ester polymer is preferably 60 mol % or less, more preferably 30 mol % or less, further preferably 15 mol % or less, depending on the types of the above other monomers.

There are no particular restrictions on the arrangement order of constituent units when the above vinyl ester polymer is a copolymer, and these can be arranged randomly or as a block. For the above vinyl ester polymer, the constituent units can be bonded in a style of head-to-tail bonding or head-to-head bonding, or combination of these.

A saponification degree of the above polymer (a1) is preferably within the range of 75 to 99.95 mol %, more preferably within the range of 80 to 99.92 mol %, further preferably within the range of 85 to 99.9 mol % in the light of the charge/discharge properties and the cycle characteristics of a battery produced. The term, "saponification degree" as used herein, means a molar proportion of vinyl alcohol units based on the total mole number of the vinyl alcohol units and the vinyl ester units.

In the light of electrode productivity, a polymerization degree of the polymer (a1) is preferably within the range of 200 to 3000, more preferably within the range of 230 to 2500, further preferably within the range of 250 to 2000 as an average polymerization degree as measured in accordance with a polyvinyl alcohol test method defined in JIS K6726-1994.

A vinyl alcohol polymer block can be a polymer block corresponding to a polymer [hereinafter, sometimes referred to as "polymer (a2)"] in which some of vinyl alcohol units contained in the above polymer (a1) are acetalized.

Examples of a compound used for the above acetalization include various aldehydes, completely acetalized products of various aldehydes, hemiacetalized products of various aldehydes, various vinyl esters and various vinyl ethers, and compounds represented by a structural formula: R—CHO, R—CH(OX)$_2$ or R—CH(OH)(OX) can be preferably used, and compounds represented by a structural formula: R—CHO can be more preferably used. In these formulas, R is a hydrogen atom, a halogen atom or a substituent having one or more carbon atoms. X is a substituent having one or more carbon atoms.

Examples of a substituent having one or more carbon atoms represented by R include alkyl groups having 1 to 20 carbon atoms such as methyl, ethyl, n-propyl, isopropyl, n-butyl, isobutyl, sec-butyl, tert-butyl, n-pentyl, n-hexyl, n-octyl and 1-ethylpentyl; aryls having 6 to 18 carbon atoms such as phenyl and naphthyl; aralkyls having 7 to 20 carbon atoms such as benzyl, 1-phenylethyl and 2-phenylethyl; and cycloalkyls having 3 to 20 carbon atoms such as cyclopentyl and cyclohexyl. Among these, R is preferably a hydrogen atom, an alkyl group having 1 to 20 carbon atoms or an aryl group having 6 to 18 carbon atoms, more preferably a hydrogen atom, an alkyl group having 1 to 8 carbon atoms or an aryl group having 6 to 10 carbon atoms, further preferably a hydrogen atom, methyl, n-propyl or phenyl, particularly n-propyl.

Examples of X described above include alkyl groups having 1 to 20 carbon atoms such as methyl, ethyl, n-propyl, isopropyl, n-butyl, isobutyl, sec-butyl, tert-butyl, n-pentyl, n-hexyl, n-octyl and 2-ethylhexyl; aryl groups having 6 to 18 carbon atoms such as phenyl and naphthyl; and aralkyl groups having 7 to 20 carbon atoms such as benzyl, 1-phenylethyl and 2-phenylethyl. When a molecule has a plurality of Xs, the Xs can be identical or different from each other.

An acetalization degree of polymer (a2) is preferably within the range of 50 to 95 mol %, more preferably within the range of 55 to 90 mol %, further preferably within the range of 60 to 85 mol %. The term, "acetalization degree" as used herein, means a proportion of a mole number of constituent units constituting acetal units to the total mole number of constituent units constituting acetal units, vinyl alcohol units and vinyl ester units. Here, one acetal unit generally consists of two vinyl alcohol units and therefore, a mole number of the constituent units constituting acetal units is generally twice as many as a mole number of acetal units. Specifically, when polymer (a2) contains vinyl alcohol units: $n^I$ moles, vinyl ester units: $n^{II}$ moles and acetal units: $n^{III}$ moles, an acetalization degree can be calculated from the equation (1):

$$\text{Acetalization degree(mol \%)} = 100 \times [n^{III} \times 2]/[n^I + n^{II} + n^{III} \times 2] \quad (1)$$

The above (meth)acrylic polymer block contains at least one constituent unit selected from the group consisting of an acrylic acid unit, an acrylate salt unit, an acrylate ester unit, a methacrylic acid unit, a methacrylate salt unit and a methacrylate ester unit. When a (meth)acrylic polymer block contains an acrylate salt unit, an acrylate ester unit, a methacrylate salt unit and/or a methacrylate ester unit, these constituent units can be used alone or a combination of two or more; for example, when a (meth)acrylic polymer block contains an acrylate salt unit, it can contain either one type of the acrylate salt unit or two or more types of the acrylate salt units. Among others, a (meth)acrylic polymer block containing an acrylic acid unit and/or an acrylate salt unit is preferable because an active material slurry can be easily prepared.

The above acrylate salt unit can be, for example, an acrylic acid metal salt unit or an ammonium acrylate unit. Furthermore, the above methacrylate salt unit can be, for example, a methacryl acid metal salt unit and an ammonium methacrylate unit. Examples of a metal constituting an acrylic acid metal salt unit or a methacrylic acid metal salt unit include alkaline metals such as lithium (Li), sodium (Na) and potassium (K); group-II metals of the periodic table such as beryllium (Be), magnesium (Mg) and calcium (Ca); transition metals such as chromium (Cr), manganese (Mn), iron (Fe), cobalt (Co), nickel (Ni), copper (Cu), ruthenium (Ru), rhodium (Rh), palladium (Pd), silver (Ag), platinum (Pt) and gold (Au); typical element metals such as aluminum (Al), zinc (Zn) and mercury (Hg); and lanthanoids such as lanthanum (La), neodymium (Nd) and europium (Eu). Among these, alkaline metals and group-II metals of the periodic table are preferable; alkaline metals are more preferable; and lithium, sodium and potassium are further preferable.

Examples of an ester in the acrylate ester unit and the methacrylate ester unit described above include alkyl esters having 1 to 20 carbon atoms such as methyl, ethyl, n-propyl, isopropyl, n-butyl, isobutyl, sec-butyl, tert-butyl, n-pentyl, n-hexyl, n-octyl and 2-ethylhexyl esters; aryl esters having 6 to 18 carbon atoms such as phenyl and naphthyl esters; and aralkyl esters having 7 to 20 carbon atoms such as benzyl, 1-phenylethyl and 2-phenylethyl esters. Among these, alkyl esters having 1 to 20 carbon atoms are preferable; alkyl esters having 1 to 8 carbon atoms are more preferable; and methyl and ethyl esters are further preferable.

A (meth)acrylic polymer block can consist of at least one constituent unit selected from the group consisting of an acrylic acid unit, an acrylate salt unit, an acrylate ester unit, a methacrylic acid unit, a methacrylate salt unit and a methacrylate ester unit, and can further contain constituent units other than these. Examples of such other constituent units include constituent units derived from olefins having 2 to 20 carbon atoms such as ethylene, propylene, 1-butene and isobutylene; vinyl ethers such as methyl vinyl ether, ethyl vinyl ether, n-butyl vinyl ether, isopropyl vinyl ether, n-butyl vinyl ether, isobutyl vinyl ether, t-butyl vinyl ether, dodecyl vinyl ether and stearyl vinyl ether; (meth)acrylamides such as acrylamide, methacrylamide, N-methylacrylamide, N-methylmethacrylamide, N-ethylacrylamide, N-ethylmethacrylamide, N,N-dimethylacrylamide, N,N-dimethylmethacrylamide, diacetoneacrylamide, diacetonemethacrylamide, N-methylolacrylamide and N-methylolmethacrylamide; and halogenated vinyls such as vinyl chloride, vinylidene chloride, vinyl fluoride and vinylidene fluoride, and the (meth) acrylic polymer block can contain one or two or more of these other constituent units. A proportion of an acrylic acid unit, an acrylate salt unit, an acrylate ester unit, a methacrylic acid unit, a methacrylate salt unit and a methacrylate ester unit to the total constituent units constituting a (meth)acrylic polymer block is preferably 50 mol % or more, more preferably 60 mol % or more, further preferably 70 mol % or more.

There are no particular restrictions to the arrangement order of constituent units in the above (meth)acrylic polymer block, and these can be arranged randomly or as a block. For the above (meth)acrylic polymer block, the constituent units can be bonded in a style of head-tail bond or head-head bond, or combination of these.

There are no particular restrictions to a process for producing a block copolymer having a (meth)acrylic polymer block; examples include a process wherein a monomer for constituting a (meth)acrylic polymer block is added to a polymer (a1) having a terminal mercapto group in the presence of a polymerization initiator to conduct radical polymerization for producing a block copolymer; and a process wherein a vinyl ester and, if necessary, other monomers are polymerized by living radical polymerization and then a monomer for constituting a (meth)acrylic polymer block is added to conduct polymerization, or alternatively, a monomer for constituting a (meth)acrylic polymer block is polymerized and then a vinyl ester and, if necessary, other monomers are added to initiate polymerization, followed by saponification, to produce a block copolymer.

A block copolymer having a polymer block corresponding to polymer (a2) can be produced by acetalizing a block copolymer having a polymer block corresponding to polymer (a1) produced as described above.

The acetalization can be conducted by, for example, an aqueous medium method wherein an aqueous solution of a block copolymer having a polymer block corresponding to polymer (a1) and the compound (various aldehydes and the like) used for the above acetalization are subjected to an acetalization reaction in the presence of an acid catalyst to precipitate polymer particles; or a solvent method wherein a block copolymer having a polymer block corresponding to polymer (a1) is dispersed in an organic solvent and acetalized with the compound (various aldehydes and the like) used for the above acetalization in the presence of an acid catalyst and from this reaction solution, a block copolymer is precipitated by a poor solvent (such as water) to the block copolymer produced. Particularly, the aqueous medium method is preferable. Furthermore, examples of an acid catalyst which can be used include inorganic acids such as hydrochloric acid, nitric acid, sulfuric acid and carbonic acid; and organic acids such as acetic acid and propionic acid. Among these, hydrochloric acid and nitric acid are particularly preferably used.

Alternatively, a block copolymer having a polymer block corresponding to polymer (a2) can be produced by adding a monomer for constituting a (meth)acrylic polymer block to polymer (a2) having a terminal mercapto group in the presence of a polymerization initiation to initiate radical polymerization.

A block copolymer having a (meth)acrylic polymer block containing an acrylate salt unit and/or a methacrylate salt unit can be produced by preliminarily producing a block copolymer having a (meth)acrylic polymer block containing an acrylic acid unit and/or a methacrylic acid unit followed by neutralizing the block polymer with an alkaline material such as a metal hydroxide.

Block copolymers other than a block copolymer having a (meth)acrylic polymer block can be produced by appropriately utilizing a known method.

If a content of the above block copolymer in an active material layer in a battery electrode of the present invention is too low, it tends to inadequately act as a binder, giving an active material layer which is easily peelable, and if the content is too high, a battery obtained tends to have deteriorated charge/discharge properties and a reduced discharge capacity per unit weight. Thus, the content is preferably within the range of 1 to 10% by mass, more preferably within the range of 1.5 to 9% by mass, further preferably within the range of 2 to 8% by mass.

There are no particular restrictions to the type of an active material used in the present invention, and a particulate active material capable of storing and discharging lithium can be preferably used as an active material (cathode active material) when a battery electrode is used as a cathode. Specifically, examples include lithium-transition metal complex oxides such as lithium-cobalt complex oxide, lithium-manganese complex oxide, lithium-nickel complex oxide, lithium-iron complex oxide, lithium-cobalt-manganese complex oxide, lithium-cobalt-nickel complex oxide, lithium-manganese-nickel complex oxide and lithium-cobalt-manganese-nickel complex oxide; lithium-transition metal phosphate compounds such as lithium-iron phosphate compound; and lithium-transition metal sulfate compound. The cathode active materials can be used alone or in combination of two or more.

When a battery electrode is used as an anode, an active material (anode active material) can be a material capable of storing and discharging lithium; specific examples include carbon materials such as graphite, amorphous carbon, carbon fiber, coke and activated charcoal; metals such as lithium, silicon, tin and silver; oxides of these metals; and alloys of these metals. The anode active materials can be used alone or in combination of two or more. When being used for a lithium ion secondary battery, an anode active material contains preferably a carbon material, particularly graphite because cycle characteristics and a discharge capacity are further improved.

A content of an active material in an active material layer in a battery electrode of the present invention is preferably within the range of 90 to 99% by mass, more preferably within the range of 91 to 98.5% by mass, further preferably within the range of 92 to 98% by mass.

An active material layer in a battery electrode of the present invention can consist of the above block copolymer and an active material or further contain an additive other than them. The additive can be, for example, an electric conduction aid. An electric conduction aid is an additive added for improving electric conductivity. Examples of an electric conduction aid include powdered carbon materials such as acetylene black, Ketjen black and carbon black; fibrous carbon materials such as vapor-grown carbon fiber (VGCF) and carbon nanotube; and conductive polymers such as polyacetylene, polyaniline, polythiophene, poly-para-phenylene, poly-para-phenylene-vinylene and poly(3,4-ethylenedioxythiophene) (PEDOT). An active material layer can contain an additive other than an electric conduction aid. The total content of these additives in an active material layer in a battery electrode of the present invention is preferably within the range of 0.05 to 20% by mass, more preferably within the range of 0.1 to 15% by mass, further preferably within the range of 0.5 to 10% by mass.

A collector used in the present invention can be a conductive material, and examples include metals such as gold, platinum, copper, aluminum, nickel, stainless steel, titanium, silver and palladium; and conductive polymers such as polyacetylene, polyaniline, polythiophene, poly-para-phenylene, poly-para-phenylene-vinylene and poly(3,4-ethylenedioxythiophene) (PEDOT). Among these, in the light of a price and durability, aluminum is suitably used as a cathode collector and copper is suitably used as an anode collector. There are no particular restrictions to the shape of the collector, and it can have a shape including a foil, a film, a sheet, a plate, a mesh, an expanded metal and a porous material. The collector can be surface-treated by plating, chromating or the like as long as conductivity is adversely affected.

In a battery electrode of the present invention, an active material layer is formed on a collector surface. The active material layer can be formed on a part of the surface of the collector surface or the whole surface of the collector surface; for example, it can be formed on one side or both sides of a collector having a foil or plate shape.

There are no particular restrictions to a method for forming an active material layer on a collector surface, and any well-known method for forming an active material layer can be employed. Specifically, an active material layer can be formed on a collector surface by kneading an active material, the above block copolymer, a solvent which can dissolve the block copolymer and, if necessary, an additive to prepare an active material slurry, applying the active material slurry to the collector and removing the solvent by drying. Examples of the solvent include, depending on the type of a block copolymer, water, N-methyl-2-pyrrolidone (NMP), dimethyl sulfoxide (DMSO) and N, N-dimethylformamide (DMF). Among these, water or a mixed solvent of water and the above solvent is preferable. The active material slurry can be applied to the collector by a doctor blade method, an ink-jet method or the like. If necessary, the active material layer formed can be molded by press molding using a rolling press machine or a flat press.

A battery electrode of the present invention is used as a component of a battery, preferably a lithium ion secondary battery. An example of a lithium ion secondary battery, in which a battery electrode of the present invention is used, is a battery having a laminate structure wherein a pair of electrodes having an active material layer (cathode and anode) are disposed in such a manner that the active material layers face each other via a separator, and in the lithium ion secondary battery, at least one of the pair of electrodes is a battery electrode of the present invention. Here, an electrode "having an active material layer" includes an electrode only consisting of an active material layer. Furthermore, the phase "active material layers face each other" means that at least a part of the active material layer in one electrode faces at least a part of the active material layer in the other electrode. In the above lithium ion secondary battery, an electrolyte composition containing a lithium-containing electrolyte salt fills the gaps between at least pair of electrodes and a separator (that is, between one electrode and a separator, and between the other electrode and a separator). A lithium ion secondary battery can have only one layer of the above laminate structure as a whole or have a piled structure of a plurality of the above laminate structures.

In a battery such as a lithium ion secondary battery, a battery electrode of the present invention can be at least one of a pair of electrodes; for example, one electrode can be a battery electrode of the present invention while the other electrode can be another type of electrode, or alternatively both electrodes can be battery electrodes of the present invention. When an electrode other than a battery electrode of the present invention is used, there are no particular restrictions to its configuration, and an electrode produced using an active material and a collector, both described in the description of a battery electrode of the present invention, and a known binder can be used.

There are no particular restrictions to the type of the above separator as long as it can prevent short circuit due to physical contact of a cathode with an anode while permitting ions such as lithium ions to transmit; examples include microporous polyolefin film such as a microporous polyethylene film and a microporous polypropylene film. For ensuring safety, a separator preferably has a function that at a predetermined temperature (for example, 120° C.) or higher, its pores are closed by thermal fusion to increase a resistance, resulting in interruption of current.

The above electrolyte composition can contain, for example, a lithium-containing electrolyte salt and a nonaqueous solvent. Such an electrolyte composition can, if necessary, further contain components other than a lithium-containing electrolyte salt or a nonaqueous solvent as long as the present invention is effective.

The above electrolyte composition can be a polymer electrolyte containing a lithium-containing electrolyte salt and a polymer. Polymer electrolytes are generally classified into gel electrolytes further containing a nonaqueous solvent and intrinsic polymer electrolytes without a nonaqueous solvent, but in the present invention, either types of polymer electrolytes can be used.

Examples of the above "lithium-containing electrolyte salt" include lithium hexafluorophosphate ($LiPF_6$), lithium tetrafluoroborate ($LiBF_4$), lithium perchlorate ($LiClO_4$), lithium nitrate ($LiNO_3$), lithium sulfate ($Li_2SO_4$), lithium hexafluoroarsenate ($LiAsF_6$), lithium methanesulfonate ($CH_3SO_3Li$), lithium trifluoromethanesulfonate ($CF_3SO_3Li$), lithium chloride (LiCl), lithium bromide (LiBr), lithium bis(trifluoromethanesulfonyl)imide ($LiN(SO_2CF_3)_2$), lithium bis(perfluoroethanesulfonyl)imide ($LiN(SO_2C_2F_5)_2$), tris(trifluoromethanesulfonyl) methyl lithium ($LiC(SO_2CF_3)_3$) and tris(perfluoroethanesulfonyl)methyl lithium ($LiC(SO_2C_2F_5)_3$). Among these, preferred are $LiPF_6$, $LiBF_4$, $LiClO_4$, $LiAsF_6$, $CH_3SO_3Li$, $CF_3SO_3Li$, $LiN(SO_2CF_3)_2$ and $LiN(SO_2C_2F_5)_2$. Among these, $LiPF_6$ and $LiBF_4$ are particularly preferable. Lithium-containing electrolyte salts can be used alone or in combination of two or more.

Examples of the above nonaqueous solvent include carbonate esters such as ethylene carbonate (EC), propylene carbonate (PC), butylene carbonate, vinylene carbonate (VC), dimethyl carbonate (DMC), ethyl methyl carbonate (EMC) and diethyl carbonate (DEC); lactones such as γ-butyrolactone (GBL), γ-valerolactone, δ-valerolactone and ε-caprolactone; ethers such as 1,2-dimethoxyethane, 1-ethoxy-2-methoxyethane, 1,2-diethoxyethane, tetrahydrofuran and 2-methyltetrahydrofuran; nitriles such as acetonitrile; sulforane compounds; phosphoric acids; phosphates; and pyrrolidones. These nonaqueous solvents can be used alone or in combination of two or more. Among these, carbonate esters and lactones are preferable, and EC, PC, DMC, EMC, DEC and GBL are particularly preferable. When a carbonate ester is used, it is preferable to combine a cyclic carbonate ester (for example, EC and PC) and a chain carbonate ester (for example, DMC, EMC and DEC) in the light of simultaneous pursuit of promotion of dissociation of a lithium-containing electrolyte salt and lithium-ion mobility.

There are no particular restrictions to a content of a lithium-containing electrolyte salt in an electrolyte composition, and when an electrolyte composition contains a lithium-containing electrolyte salt and a nonaqueous solvent, a molar proportion of the lithium-containing electrolyte salt to the total mass of the lithium-containing electrolyte salt and the nonaqueous solvent is preferably within the range of 0.1 to 10 mmol/g, more preferably within the range of 0.2 to 5 mmol/g, further preferably within the range of 0.5 to 2 mmol/g.

Examples of a polymer used for a polymer electrolyte include polyalkylene oxides such as polyethylene oxide (PEO) and polypropylene oxide (PPO); poly(vinylidene fluoride-hexafluoropropylene) copolymer (P(VDF-HFP)); polyacrylonitrile (PAN); polymethyl methacrylate (PMMA); polyvinylbutyral (PVB); polyvinylformal (PVF); polyvinyl acetacetal; and copolymers thereof. Among these, an ion-conducting polymer which can dissolve lithium ions is preferable.

There are no particular restrictions to a specific configuration of a battery such as a lithium ion secondary battery; for example, a configuration where the laminate structure described above (a laminate structure in which a pair of electrodes having an active material layer are disposed in such a manner that the active material layers face each other via a separator) is accommodated as one layer as a whole, as a laminate of a plurality of layers or as a winded material in a battery case. An electrode can be, if necessary, connected to a lead for collecting electricity generated. The lead can be drawn to the outside of a battery case, or alternatively it can be contacted with a battery case for collecting electricity. There are no particular restrictions to the shape of a battery case; for example, cylindrical or flat. There are no particular restrictions to a material for the case, and it can be a metallic can or a laminate film.

EXAMPLES

The present invention will be further detailed with reference to Examples, but the present invention is not limited to these examples in any way.

Production Example 1

Production of Polyvinyl Alcohol-(b)-Polyacrylic Acid Copolymer (Polymer A)

In a 3-liter four-neck separable flask equipped with a reflux condenser and an impeller were charged 737 g of ion-exchange water and 100 g of a polyvinyl alcohol having a terminal mercapto group (polymerization degree: 1500, saponification degree: 98.5 mol %), and the mixture was heated to 90° C. to dissolve the polyvinyl alcohol and then cooled to room temperature. To the aqueous solution was added with stirring 19.8 g of acrylic acid and the solution was heated to 70° C. Then, the atmosphere of the system was substituted with nitrogen by bubbling nitrogen into the aqueous solution for 30 min. After nitrogen substitution, to the aqueous solution was added 37.6 mL of a 2.5% by mass aqueous solution of potassium persulfate sequentially over 90 min to initiate and promote block copolymerization and the system was kept at 75° C. for 60 min to allow the reaction to further proceed. Then, the mixture was cooled to give an aqueous solution of a polyvinyl alcohol-(b)-polyacrylic acid copolymer (polymer A) with a solid content of 13% by mass. A part of the resulting aqueous solution was dried, dissolved in deuterated water and subjected to $^1$H-NMR measurement at 270 MHz. A mass proportion expressed as [vinyl alcohol polymer block mass]/[(meth)acrylic polymer block mass] was 100/18. By adding additional ion-exchange water to the above solution of polymer A ion, a solid content was adjusted to 8% by mass.

Production Example 2

Production of Polyvinyl Alcohol-(b)-Polyacrylic Acid Salt Copolymer (Polymer B)

To ion-exchange water was added lithium hydroxide (LiOH) to 1 mol/L, to prepare an aqueous solution of lithium hydroxide. Then, to an aqueous solution of polymer A with a solid content of 13% by mass prepared as described in Production Example 1 was added with stirring the above aqueous solution of lithium hydroxide in an amount of 0.4 equivalent to the amount which would neutralize all carboxyl groups in acrylic acid units in polymer A, to prepare an aqueous solution of polyvinyl alcohol-(b)-polyacrylic acid salt copolymer (polymer B). Using a pH test paper, acidity of the aqueous solution was determined to be pH 6. To the solution was added additional ion-exchange water to adjust a solid content to 8% by mass.

Production Example 3

Production of Polyvinyl Alcohol-(b)-Polyacrylic Acid Copolymer (Polymer C)

An aqueous solution of polyvinyl alcohol-(b)-polyacrylic acid copolymer (polymer C) was prepared as described in Production Example 1, substituting a polyvinyl alcohol having a terminal mercapto group (polymerization degree: 500, saponification degree: 98.5 mol %) for a polyvinyl alcohol having a terminal mercapto group (polymerization degree: 1500, saponification degree: 98.5 mol %). To the solution was added additional ion-exchange water to adjust a solid content to 8% by mass.

Production Example 4

Production of Polyvinyl Alcohol-(b)-Polyacrylic Acid Copolymer (Polymer D)

An aqueous solution of polyvinyl alcohol-(b)-polyacrylic acid copolymer (polymer D) was prepared as described in Production Example 1, substituting a polyvinyl alcohol having a terminal mercapto group (polymerization degree: 1500, saponification degree: 99.9 mol %) for a polyvinyl alcohol having a terminal mercapto group (polymerization degree: 1500, saponification degree: 98.5 mol %). To the solution was added additional ion-exchange water to adjust a solid content to 8% by mass.

Production Example 5

Production of Polyvinyl Alcohol-(b)-Polyacrylic Acid Copolymer (Polymer E)

An aqueous solution of polyvinyl alcohol-(b)-polyacrylic acid copolymer (polymer E) was prepared as described in Production Example 1, substituting a polyvinyl alcohol having a terminal mercapto group (polymerization degree: 300, saponification degree: 88 mol %) for a polyvinyl alcohol having a terminal mercapto group (polymerization degree:

1500, saponification degree: 98.5 mol %). To the solution was added additional ion-exchange water to adjust a solid content to 8% by mass.

Production Example 6

Production of Polyvinyl Alcohol-Polyacrylic Acid Graft Copolymer (Polymer K)

In a 3-liter four-neck separable flask equipped with a reflux condenser and an impeller were charged 737 g of ion-exchange water, 12 g of a 60% acrylic acid and 1.0 g of sodium formate, to give a uniform mixed solution. With stirring, to the mixed solution was added 100 g of a polyvinyl alcohol (polymerization degree: 1700, saponification degree: 98.5 mol %), and the internal temperature was elevated to 70° C. under nitrogen substitution. Thirty minutes after nitrogen substitution, 5.0 g of 10% 2,2'-azobis(2-methylpropionamidine)dihydrochloride was added to the mixed solution to initiate polymerization. Separately, 1.0 g of sodium formate was added to 48 g of a 60% aqueous solution of acrylic acid to prepare a solution, which was then added dropwise to the above mixed solution over 5 hours after the initiation of the reaction. Five hours after the reaction initiation, 5.0 g of 10% 2,2'-azobis(2-methylpropionamidine)dihydrochloride was again added to the above mixed solution, and the polymerization was allowed to proceed further 17 hours. Then, the solution was cooled to give an aqueous solution of polyvinyl alcohol-polyacrylic acid graft copolymer (polymer K). A part of the resulting aqueous solution was dried, dissolved in deuterated water and subjected to $^1$H-NMR measurement at 270 MHz. A mass proportion expressed as [vinyl alcohol unit mass]/[(meth)acrylic acid unit mass] was 100/20. By adding additional ion-exchange water to the above solution of polymer K, a solid content was adjusted to 10% by mass.

Production Example 7

Production of Polyvinyl Alcohol-Polyacrylic Acid Graft Copolymer (Polymer L)

An aqueous solution of polyvinyl alcohol-polyacrylic acid graft copolymer (polymer L) was prepared as described in Production Example 6, except that a polyvinyl alcohol with a different saponification degree (polymerization degree: 1700, saponification degree: 88 mol %) was used. $^1$H-NMR measurement at 270 MHz indicated that a mass proportion expressed as [vinyl alcohol unit mass]/[(meth)acrylic acid unit mass] was 100/20. By adding additional ion-exchange water to the solution, a solid content was adjusted to 10% by mass.

Example 1

Production of a Battery Electrode

As an active material, natural graphite (average particle size: 3 μm) was mixed with a solution of polymer A prepared in Production Example 1 as an aqueous solution containing a binder (solid content: 8% by mass) in such amounts that 5 parts by mass of polymer A was mixed with 95 parts by mass of natural graphite, and to the mixture was further added ion-exchange water in an appropriate amount to prepare an active material slurry. Then, the above active material slurry was applied to one side surface of a nickel mesh (wire diameter: 0.1 mm, aperture: 0.154 mm) as a collector by a doctor blade method and dried to prepare a battery electrode having an active material layer on a collector surface. A thickness of the active material layer was 60 μm.

Preparation of an Electrolyte Composition

To propylene carbonate (PC) as a nonaqueous solvent was added lithium perchlorate (LiClO$_4$) as a lithium-containing electrolyte salt to a concentration of 0.79 mmol/g, to prepare an electrolyte composition.

Figure 1:
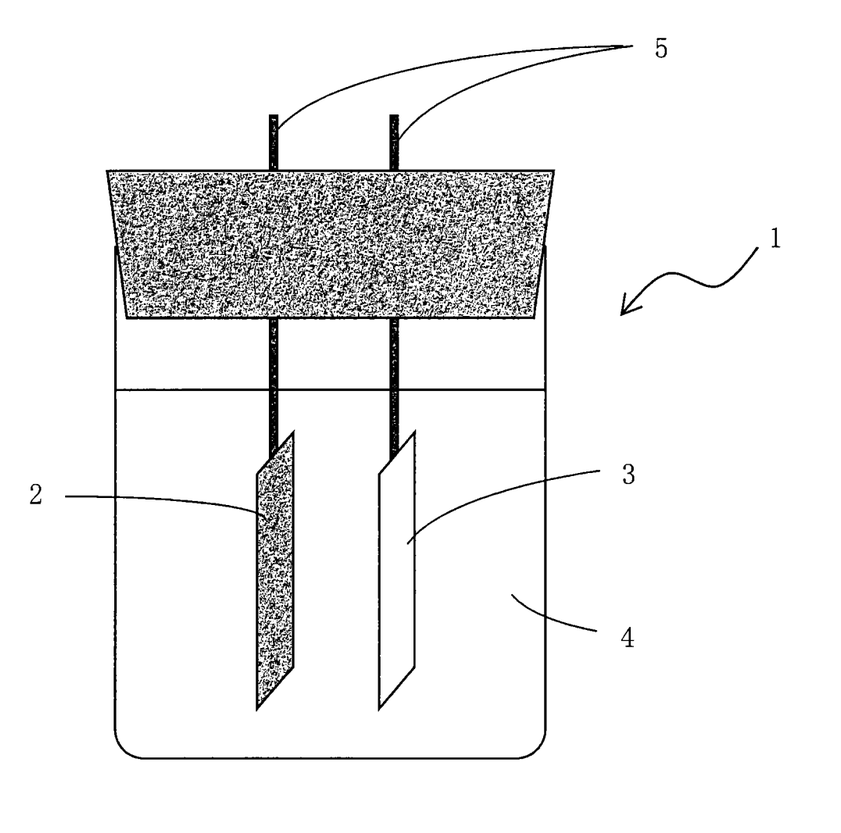
FIG. 1 schematically shows a bipolar beaker-type lithium ion secondary battery for evaluation, which is produced in Examples and Comparative Examples.

Production of a Bipolar Beaker-Type Lithium Ion Secondary Battery for Evaluation A lithium metal foil cut as a strip (a lamination of five lithium metal foils with a thickness of 200 μm) was prepared as a counter electrode for the battery electrode produced above. A battery electrode 2 and a counter electrode 3 to which leads 5 were connected were disposed such that the active material layer of the battery electrode faced the counter electrode and the active material layer was completely immersed in the electrolyte composition 4, to produce a bipolar beaker-type lithium ion secondary battery 1 for evaluation schematically shown in FIG. 1.

Evaluation of Charge/Discharge Properties

The bipolar beaker-type lithium ion secondary battery for evaluation which was produced above was evaluated for charge/discharge properties. Specifically, for the battery, constant current charge was conducted to 0 V at a current set to 100 mA/g to the graphite active material. At the end of charging, constant current discharge was conducted to 2V at a current set to 100 mA/g to the graphite active material. For the above procedure, an initial charge/discharge polarization, an initial charging capacity, an initial discharging capacity and an initial charge/discharge efficiency were determined. Furthermore, regarding the above procedure as one cycle, 30 cycles were conducted, and a discharging capacity in 30th cycle was determined and was divided by the maximum discharging capacity among 30 cycles to calculate a 30th cycle discharging capacity retention rate.

Example 2

A battery electrode and a bipolar beaker-type lithium ion secondary battery for evaluation were produced and evaluated for charge/discharge properties as described in Example 1, except that an aqueous solution of polymer A (a solid content of 8% by mass) was replaced with an aqueous solution of polymer B (a solid content of 8% by mass) and natural graphite and an aqueous solution of polymer B were blended such that the amounts of natural graphite and polymer B were 95 parts by mass and 5 parts by mass, respectively.

Example 3

A battery electrode and a bipolar beaker-type lithium ion secondary battery for evaluation were produced and evaluated for charge/discharge properties as described in Example 1, except that natural graphite and an aqueous solution of polymer A were blended such that the amounts of natural graphite and polymer A were 92 parts by mass and 8 parts by mass, respectively.

Example 4

A battery electrode and a bipolar beaker-type lithium ion secondary battery for evaluation were produced and evaluated for charge/discharge properties as described in Example 1, except that natural graphite and an aqueous solution of polymer A were blended such that the amounts of natural graphite and polymer A were 97 parts by mass and 3 parts by mass, respectively.

Example 5

A battery electrode and a bipolar beaker-type lithium ion secondary battery for evaluation were produced and evaluated for charge/discharge properties as described in Example 1, except that an aqueous solution of polymer A (a solid content of 8% by mass) was replaced with an aqueous solution of polymer C (a solid content of 8% by mass) and natural graphite and an aqueous solution of polymer C were blended such that the amounts of natural graphite and polymer C were 92 parts by mass and 8 parts by mass, respectively.

Example 6

A battery electrode and a bipolar beaker-type lithium ion secondary battery for evaluation were produced and evaluated for charge/discharge properties as described in Example 1, except that an aqueous solution of polymer A (a solid content of 8% by mass) was replaced with an aqueous solution of polymer D (a solid content of 8% by mass) and natural graphite and an aqueous solution of polymer D were blended such that the amounts of natural graphite and polymer D were 95 parts by mass and 5 parts by mass, respectively.

Example 7

A battery electrode and a bipolar beaker-type lithium ion secondary battery for evaluation were produced and evaluated for charge/discharge properties as described in Example 1, except that an aqueous solution of polymer A (a solid content of 8% by mass) was replaced with an aqueous solution of polymer E (a solid content of 8% by mass) and natural graphite and an aqueous solution of polymer E were blended such that the amounts of natural graphite and polymer E were 92 parts by mass and 8 parts by mass, respectively.

Example 8

A battery electrode and a bipolar beaker-type lithium ion secondary battery for evaluation were produced and evaluated for charge/discharge properties as described in Example 1, except that as a nonaqueous solvent, propylene carbonate (PC) alone was replaced with a mixture of 60 parts by mass of propylene carbonate (PC), 20 parts by mass of ethylene carbonate (EC) and 20 parts by mass of dimethyl carbonate (DMC).

Comparative Example 1

A battery electrode and a bipolar beaker-type lithium ion secondary battery for evaluation were produced and evaluated for charge/discharge properties as described in Example 1, except that an aqueous solution of polymer A (a solid content of 8% by mass) was replaced with an aqueous solution (a solid content of 10% by mass) of polyvinyl alcohol (polymer F; polymerization degree: 2400; saponification degree: 98.5 mol %) and natural graphite and the aqueous solution of polymer F were blended such that the amounts of natural graphite and polymer F were 95 parts by mass and 5 parts by mass, respectively.

Comparative Example 2

A battery electrode and a bipolar beaker-type lithium ion secondary battery for evaluation were produced and evaluated for charge/discharge properties as described in Comparative Example 1, except that natural graphite and the aqueous solution of polymer F were blended such that the amounts of natural graphite and polymer F were 92 parts by mass and 8 parts by mass, respectively.

Comparative Example 3

A battery electrode and a bipolar beaker-type lithium ion secondary battery for evaluation were produced and evaluated for charge/discharge properties as described in Comparative Example 1, except that natural graphite and the aqueous solution of polymer F were blended such that the amounts of natural graphite and polymer F were 97 parts by mass and 3 parts by mass, respectively.

Comparative Example 4

A battery electrode and a bipolar beaker-type lithium ion secondary battery for evaluation were produced and evaluated for charge/discharge properties as described in Example 1, except that an aqueous solution of polymer A (a solid content of 8% by mass) was replaced with an aqueous solution (a solid content of 10% by mass) of polyvinyl alcohol (polymer G; polymerization degree: 500; saponification degree: 98.5 mol %) and natural graphite and the aqueous solution of polymer G were blended such that the amounts of natural graphite and polymer G were 92 parts by mass and 8 parts by mass, respectively.

Comparative Example 5

A battery electrode and a bipolar beaker-type lithium ion secondary battery for evaluation were produced and evaluated for charge/discharge properties as described in Example 1, except that an aqueous solution of polymer A (a solid content of 8% by mass) was replaced with an aqueous solution (a solid content of 10% by mass) of polyvinyl alcohol (polymer H; polymerization degree: 1500; saponification degree: 99.9 mol %) and natural graphite and the aqueous solution of polymer H were blended such that the amounts of natural graphite and polymer H were 95 parts by mass and 5 parts by mass, respectively.

Comparative Example 6

A battery electrode and a bipolar beaker-type lithium ion secondary battery for evaluation were produced and evaluated for charge/discharge properties as described in Example 1, except that an aqueous solution of polymer A (a solid content of 8% by mass) was replaced with an aqueous solution (a solid content of 10% by mass) of polyvinyl alcohol (polymer I; polymerization degree: 300; saponification degree: 88 mol %) and natural graphite and the aqueous solution of polymer I were blended such that the amounts of natural graphite and polymer I were 92 parts by mass and 8 parts by mass, respectively.

Comparative Example 7

A battery electrode and a bipolar beaker-type lithium ion secondary battery for evaluation were produced and evaluated for charge/discharge properties as described in Example 1, except that an aqueous solution of polymer A (a solid content of 8% by mass) was replaced with an aqueous solution (a solid content of 10% by mass) of polyvinyl alcohol-polyacrylic acid random copolymer (Baudaru Kagaku, TSP515; polymerization degree: 1500, saponification degree: 98.5 mol %, mass ratio expressed as [vinyl alcohol unit mass]/[(meth)acrylic acid unit mass]: 100/20, referred to as "polymer J"), natural graphite and the aqueous solution of polymer J were blended such that the amounts of natural graphite and polymer J were 95 parts by mass and 5 parts by mass, respectively, and as a nonaqueous solvent, a mixture of ethylene carbonate (EC) and dimethyl carbonate (DMC) (volume ratio=1:1) was used.

Comparative Example 8

A battery electrode and a bipolar beaker-type lithium ion secondary battery for evaluation were produced and evaluated for charge/discharge properties as described in Example 1, except that an aqueous solution of polymer A (a solid content of 8% by mass) was replaced with an aqueous solution of polyvinyl alcohol-polyacrylic acid graft copolymer (polymer K) (a solid content of 10% by mass), natural graphite and the aqueous solution of polymer K were blended such that the amounts of natural graphite and polymer K were 95 parts by mass and 5 parts by mass, respectively, and as a nonaqueous solvent, a mixture of ethylene carbonate (EC) and dimethyl carbonate (DMC) (volume ratio=1:1) was used.

Comparative Example 9

A battery electrode and a bipolar beaker-type lithium ion secondary battery for evaluation were produced and evaluated for charge/discharge properties as described in Example 1, except that an aqueous solution of polymer A (a solid content of 8% by mass) was replaced with an aqueous solution of polyvinyl alcohol-polyacrylic acid graft copolymer (polymer L) (a solid content of 10% by mass), natural graphite and the aqueous solution of polymer L were blended such that the amounts of natural graphite and polymer L were 95 parts by mass and 5 parts by mass, respectively, and as a nonaqueous solvent, a mixture of ethylene carbonate (EC) and dimethyl carbonate (DMC) (volume ratio=1:1) was used.

The results of Examples and Comparative Examples described above are shown in Table 1.

TABLE 1

| | Binder | | | | | | Evaluation results of charge/discharge properties | | | | |
|---|---|---|---|---|---|---|---|---|---|---|---|---|
| | | Vinyl alcohol polymer block | | | | | Electrolyte composition | Initial charge/ | | | | 30th cycle |
| | Type | Polymerization degree | Saponification degree [mol %] | (Meth)acrylic polymer block Neutralization degree [mol %] | Mass ratio*1) | Content*2) [mass %] | Nonaqueous solvent Type*3) | discharge polarization [V] | Initial charging capacity [mAh/g] | Initial discharging capacity [mAh/g] | Initial charge/ discharge efficiency [%] | discharge capacity retention rate [%] |
| Example 1 | Polymer A | 1500 | 98.5 | 0 | 100/18 | 5 | PC | 0.079 | 429 | 332 | 77.5 | 99.9 |
| Example 2 | Polymer B | 1500 | 98.5 | 40 | 100/19 | 5 | PC | 0.088 | 419 | 330 | 78.7 | 99.9 |
| Example 3 | Polymer A | 1500 | 98.5 | 0 | 100/18 | 8 | PC | 0.086 | 426 | 330 | 77.3 | 99.9 |
| Example 4 | Polymer A | 1500 | 98.5 | 0 | 100/18 | 3 | PC | 0.074 | 416 | 323 | 77.6 | 99.6 |
| Example 5 | Polymer C | 500 | 98.5 | 0 | 100/18 | 8 | PC | 0.080 | 420 | 326 | 77.6 | 99.9 |
| Example 6 | Polymer D | 1500 | 99.9 | 0 | 100/18 | 5 | PC | 0.085 | 438 | 333 | 76.1 | 99.6 |
| Example 7 | Polymer E | 300 | 88 | 0 | 100/18 | 8 | PC | 0.080 | 441 | 333 | 75.5 | 99.5 |
| Example 8 | Polymer A | 1500 | 98.5 | 0 | 100/18 | 5 | PC + EC + DMC | 0.059 | 407 | 325 | 80.1 | 99.5 |
| Comparative Example 1 | Polymer F | 2400*4) | 98.5*4) | — | — | 5 | PC | 0.092 | 452 | 315 | 69.7 | 98.7 |
| Comparative Example 2 | Polymer F | 2400*4) | 98.5*4) | — | — | 8 | PC | 0.100 | 459 | 318 | 69.2 | 98.8 |
| Comparative Example 3 | Polymer F | 2400*4) | 98.5*4) | — | — | 3 | PC | 0.086 | 430 | 301 | 70.1 | 98.2 |
| Comparative Example 4 | Polymer G | 500*4) | 98.5*4) | — | — | 8 | PC | 0.099 | 443 | 305 | 68.9 | 98.7 |
| Comparative Example 5 | Polymer H | 1500*4) | 99.9*4) | — | — | 5 | PC | 0.101 | 435 | 301 | 69.2 | 98.5 |
| Comparative Example 6 | Polymer I | 300*4) | 88*4) | — | — | 8 | PC | 0.094 | 433 | 298 | 68.8 | 98.7 |
| Comparative Example 7 | Polymer J | 1500*5) | 98.5*5) | 0 | 100/20 | 5 | EC + DMC | 0.085 | 400 | 300 | 75 | 94 |
| Comparative Example 8 | Polymer K | 1700*6) | 98.5*6) | 0 | 100/20 | 5 | EC + DMC | 0.088 | 280 | 250 | 89 | 97 |
| Comparative Example 9 | Polymer L | 1700*6) | 88*6) | 0 | 100/20 | 5 | EC + DMC | 0.082 | 390 | 305 | 78 | 96 |

*1)Examples 1 to 8: [vinyl alcohol polymer block mass]/[(meth)acrylic polymer block mass], Comparative Examples 7 to 9: [vinyl alcohol unit mass]/[(meth)acrylic acid unit mass]
*2)A content of a binder in an active material layer
*3)PC: propylene carbonate, EC: ethylene carbonate, DMC: dimethyl carbonate
*4)A polymerization degree and a saponification degree of polyvinyl alcohol
*5)A polymerization degree and a saponification degree of the whole random copolymer
*6)A polymerization degree and a saponification degree of a main-chain polyvinyl alcohol in a graft copolymer As is obvious from Table 1, an initial charge/discharge polarization was small in Examples 1 to 8 meeting the configuration conditions of the present invention. As a result, an initial charge/discharge efficiency and a 30th cycle discharge capacity retention rate were improved. This would be because less polarization resulted in smoother insertion and removal of lithium ions in a graphite active material and more reduced energy loss during charge/discharge.

In Comparative Examples 1 to 6 where an active material layer was made of a polyvinyl alcohol homopolymer alone, an initial charge/discharge polarization is large and therefore an electric resistance during charge/discharge is increased, leading to reduction in an initial charge/discharge efficiency. Furthermore, for Comparative Example 7 using polyvinyl alcohol-polyacrylic acid random copolymer in an active material layer, and Comparative Examples 8 and 9 using polyvinyl alcohol-polyacrylic acid graft copolymer, reduction in a 30th cycle discharge capacity retention rate was observed. This would be because crystallinity of a polyvinyl alcohol was reduced and water molecules in the polyvinyl alcohol were increased, leading to deterioration of a binder due to water decomposition after repeated cycle tests.

DESCRIPTION OF SYMBOLS

1: Bipolar beaker-type lithium ion secondary battery for evaluation
2: Battery electrode
3: Counter electrode
4: Electrolyte composition
5: Lead

The invention claimed is:

1. A battery electrode, comprising:
an active material layer,
wherein the active material layer is formed on a collector surface, and
the active material layer comprises an active material and a block copolymer having a vinyl alcohol polymer block wherein said vinyl alcohol polymer block is produced by saponifying a vinyl ester polymer and has a saponification degree of from 75 to 99.95 mol %.

2. The battery electrode according to claim 1,
wherein the vinyl alcohol polymer block has a saponification degree of from 80 to 99.92 mol %.

3. The battery electrode according to claim 1,
wherein the vinyl alcohol polymer block has a polymerization degree of from 200 to 3000.

4. The battery electrode according to claim 1,
wherein the block copolymer further comprises:
a polymer block comprising a constituent unit selected from the group consisting of an acrylic acid unit, an acrylate salt unit, an acrylate ester unit, a methacrylic acid unit, a methacrylate salt unit and a methacrylate ester unit.

5. The battery electrode according to claim 1,
wherein the active material layer comprises the block copolymer in an amount of from 1 to 10% by mass.

6. The battery electrode according to claim 1,
wherein the active material comprises graphite.

7. A lithium ion secondary battery having a laminate structure, the lithium ion secondary battery comprising:
a pair of electrodes comprising an active material layer disposed such that active material layers face each other via a separator, and
an electrolyte composition comprising a lithium-containing electrolyte salt fills gaps between the pair of electrodes and the separator,
wherein at least one of the pair of electrodes is the battery electrode as claimed in claim 1.

8. The lithium ion secondary battery according to claim 7,
wherein the electrolyte composition comprises propylene carbonate.

9. The battery electrode according to claim 1,
wherein the block copolymer further comprises:
a polymer block comprising a constituent unit selected from the group consisting of an acrylate ester unit, a methacrylic acid unit, a methacrylate salt unit and a methacrylate ester unit.

* * * * *